US010164700B2

(12) United States Patent
Chen et al.

(10) Patent No.: US 10,164,700 B2
(45) Date of Patent: Dec. 25, 2018

(54) FAULT DETECTION METHOD AND FAULT DETECTION DEVICE FOR EXTERNAL ANTENNA

(71) Applicant: Huawei Technologies Co., Ltd., Shenzhen (CN)

(72) Inventors: Pinhui Chen, Shenzhen (CN); Kheng Hong Ang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/745,037

(22) PCT Filed: Mar. 31, 2016

(86) PCT No.: PCT/CN2016/077995
§ 371 (c)(1),
(2) Date: Jan. 15, 2018

(87) PCT Pub. No.: WO2017/166168
PCT Pub. Date: Oct. 5, 2017

(65) Prior Publication Data
US 2018/0212667 A1 Jul. 26, 2018

(51) Int. Cl.
*H04B 17/00* (2015.01)
*H04B 7/08* (2006.01)
(Continued)

(52) U.S. Cl.
CPC ............. *H04B 7/08* (2013.01); *H04B 7/04* (2013.01); *H04B 17/17* (2015.01); *H04B 17/21* (2015.01)

(58) Field of Classification Search
CPC ....... H04B 17/17; H04B 1/0466; H04B 17/21

USPC ........... 455/423, 67.11, 562.1; 342/173, 360
See application file for complete search history.

(56) References Cited

U.S. PATENT DOCUMENTS 5,952,963 A * 9/1999 Shen .................... H04B 7/0811
342/367
6,188,879 B1 * 2/2001 Imamura ................ H04B 7/082
455/277.1
(Continued)

FOREIGN PATENT DOCUMENTS

CN 101217303 A 7/2008
CN 102325332 A 1/2012

OTHER PUBLICATIONS

Machine Translation and Abstract of Chinese Publication No. CN101217303, Jul. 9, 2008, 16 pages.
(Continued)

*Primary Examiner* — Sonny Trinh
(74) *Attorney, Agent, or Firm* — Conley Rose, P.C.

(57) ABSTRACT

A fault detection method and a fault detection device for external antennas, where the method comprises generating a first detection signal and transmitting the first detection signal using a main antenna, detecting whether a diversity antenna receives the first detection signal, acquiring a signal strength difference between the signals received by the main antenna and the diversity antenna, respectively, determining that the diversity antenna is faulty when the signal strength difference is not less than a first threshold, determining that the main antenna is faulty when the signal strength difference is not larger than a second threshold, and determining that the main antenna and the diversity antenna are faulty when the signal strength difference is larger than the second threshold and less than the first threshold.

20 Claims, 6 Drawing Sheets

(51) Int. Cl.
*H04B 7/04* (2017.01)
*H04B 17/17* (2015.01)
*H04B 17/21* (2015.01)

(56) References Cited

U.S. PATENT DOCUMENTS

| | | | | |
|---|---|---|---|---|
| 6,266,528 | B1* | 7/2001 | Farzaneh | H04W 24/00 342/173 |
| 6,327,481 | B1* | 12/2001 | Nagashima | H04B 7/0814 455/562.1 |
| 6,629,974 | B2 | 10/2003 | Penny et al. | |
| 7,570,620 | B2* | 8/2009 | Miyata | H04W 24/00 370/328 |
| 8,934,855 | B2* | 1/2015 | Gale | H01Q 1/1257 342/378 |
| 2001/0055959 | A1* | 12/2001 | Shen | H04B 7/0811 455/277.1 |
| 2002/0118724 | A1* | 8/2002 | Kishimoto | H04B 7/0814 375/132 |
| 2011/0249831 | A1 | 10/2011 | Bellamy | |
| 2013/0344831 | A1* | 12/2013 | Yuan | H04W 24/04 455/226.2 |

OTHER PUBLICATIONS

Machine Translation and Abstract of Chinese Publication No. CN102325332, Jan. 18, 2012, 9 pages.
Foreign Communication From a Counterpart Application, PCT Application No. PCT/CN2016/077995, English Translation of International Search Report dated Jan. 4, 2017, 2 pages.

\* cited by examiner

ND FAULT
FAULT DETECTION METHOD AND FAULT DETECTION DEVICE FOR EXTERNAL ANTENNA

CROSS-REFERENCE TO RELATED APPLICATION

This application is a U.S. National Stage of International Patent Application No. PCT/CN2016/077995 filed on Mar. 31, 2016, which is hereby incorporated by reference in its entirety.

TECHNICAL FIELD

The present disclosure relates to the field of communications technologies, and in particular, to a fault detection method and fault detection device for an external antenna.

BACKGROUND

In recent years, with emergence of a mobile Internet, a growing quantity of vehicles are equipped with a third generation (3G) or fourth generation (4G) communication function. Compared with a common consumer product, an in-vehicle product has a worse use environment, imposes a higher requirement on reliability, and requires each electronic component in a vehicle to have a fault diagnosis function. An in-vehicle communication function is implemented using a circuit shown in FIG. 1. An external antenna is used to receive and send a radio frequency signal, where the external antenna includes a main antenna and a diversity antenna. A radio frequency coaxial cable is used to transmit a radio frequency signal. An in-vehicle communications device on a vehicle side transmits and receives a radio frequency signal using a radio frequency path. If a user cannot perform communication using the in-vehicle communication function, during detection of a reason why communication cannot be performed, fault determining needs to be performed on the vehicle side, the radio frequency coaxial cable, and the external antenna one by one to finally find a fault location. As a result, complexity and a consumption time of fault diagnosis are increased. Therefore, if the external antenna has the fault diagnosis function, when the in-vehicle communication function fails, steps of detecting the radio frequency coaxial cable and the vehicle side can be avoided when it is known that the external antenna is faulty, or fault diagnosis does not need to be performed on the external antenna when it is known that the external antenna is not faulty.

A fault detection method 1 for an in-vehicle external antenna is as follows. As shown in FIG. 2, a direct current voltage (VCC) is input on a vehicle side, the VCC is connected to one end of a resistor R1, the other end of the resistor R1 is connected to one end of an inductor L, and the other end of the inductor L is connected to a radio frequency path. The VCC does not exert impact on a radio frequency signal transmitted using the radio frequency path and a radio frequency coaxial cable. As shown in FIG. 3, the external antenna includes an antenna board and an antenna body. The antenna board includes a ground terminal. Voltage division can be implemented by connecting, in parallel, a resistor R2, as shown in FIGS. 2 and 3, with a specific resistance value range at an input end of the antenna board. The antenna body is not considered during calculation of a resistance range of the antenna board. As shown in FIG. 2, a voltage detection point is disposed between the resistor R1 and the inductor L on the vehicle side, and a voltage value at the voltage detection point is sampled. If the antenna board operates normally, it indicates that components on the antenna board are all normal. In this case, a resistance value of the antenna board falls within a steady resistance value variation range, and a voltage value detected at the voltage detection point definitely also falls within a steady voltage value variation range. A maximum value and a minimum value of the voltage variation range are set as thresholds. If the antenna board is faulty, it indicates that a component on the antenna board is damaged, and the resistance value of the antenna board is increased or decreased consequently. In this case, the voltage value obtained at the voltage detection point is not between the thresholds such that it can be learned that the external antenna is faulty, and a fault indication is provided.

A fault detection method 2 for an in-vehicle external antenna is as follows. As shown in FIG. 4, the external antenna has a main antenna and a diversity antenna, the external antenna is connected to a detection device, and the detection device includes a detector, a directional coupler, and the like. A communication baseband processor sends an input signal to the main antenna using a transmitter, and the main antenna transmits the input signal. Because an object generally has a feature of reflecting an electromagnetic wave (the input signal is an electromagnetic wave), the main antenna and the diversity antenna may receive a reflected signal obtained by reflecting the input signal by a closest object. The detector of the detection device may obtain the input signal from the main antenna, and may obtain the reflected signal from the main antenna and the diversity antenna. The input signal and the reflected signal are coupled using the directional coupler, and are demodulated and compared to obtain a reflection factor of the external antenna. A smaller reflection factor indicates that more input signals are radiated from the main antenna, and indicates better performance of the external antenna. Because the performance of the external antenna is known, it is set that when the reflection factor is greater than a given threshold, it indicates that the external antenna is faulty, and a fault indication is provided.

However, a potential failure mode exists in the fault detection method 1 for an in-vehicle external antenna, that is, if the antenna body of the external antenna is damaged but the antenna board is normal, overall resistance of the external antenna is not changed, but the radio frequency signal cannot be received or sent, and the voltage value detected at the voltage detection point falls within a normal range. In the potential failure mode, a fault of the external antenna cannot be detected. In the fault detection method 2, because components such as a detector and a directional coupler need to be added, costs are increased. In addition, because the diversity antenna does not have a corresponding transmitter, the diversity antenna does not have an input signal, and can receive only the reflected signal obtained by reflecting, by an object, the input signal transmitted by the main antenna. Consequently, fault detection cannot be performed on the diversity antenna. In this case, when the diversity antenna of the external antenna is faulty but the main antenna is normal, it is detected that the reflection factor of the external antenna is normal, and an obtained result is that the external antenna is normal. However, the in-vehicle communication function fails. Therefore, when the diversity antenna of the external antenna is faulty, no fault indication can be provided.

SUMMARY

Embodiments of the present disclosure provide a fault detection method and fault detection device for an external antenna in order to determine, on an original 3G or 4G communication hardware circuit using a detection signal and antenna isolation, whether the external antenna is faulty, and determine fault statuses of a main antenna and a diversity antenna according to a main-diversity received signal strength difference such that accuracy of determining an external antenna fault is improved when costs are reduced.

A first aspect of the present disclosure provides a fault detection method for an external antenna, where the external antenna includes a main antenna and a diversity antenna, and the fault detection method includes generating a first detection signal, transmitting the first detection signal using the main antenna, detecting whether the diversity antenna receives the first detection signal transmitted by the main antenna, determining that the external antenna is faulty if the diversity antenna does not receive the first detection signal, or setting the received first detection signal as a second detection signal if the diversity antenna receives the first detection signal, obtaining antenna isolation according to the first detection signal and the second detection signal, determining, according to the antenna isolation, whether the external antenna is faulty, obtaining a main-diversity received signal strength difference of the external antenna if the external antenna is faulty, determining that the diversity antenna is faulty if the main-diversity received signal strength difference is not less than a first threshold, determining that the main antenna is faulty if the main-diversity received signal strength difference is not greater than a second threshold, or determining that the main antenna and the diversity antenna are faulty if the main-diversity received signal strength difference is greater than the second threshold and less than the first threshold.

A fault detection device is connected to the external antenna using a radio frequency coaxial cable, the external antenna has the main antenna and the diversity antenna, and the main antenna and the diversity antenna each can receive a radio frequency signal sent by a same base station. Therefore, the main-diversity received signal strength difference may be obtained. The first threshold and the second threshold are preset and used as conditions for determining whether the main antenna and the diversity antenna are faulty. When there is a need to detect whether the external antenna is faulty, the fault detection device generates the first detection signal, and transmits the first detection signal using the main antenna, detects whether the diversity antenna receives the first detection signal transmitted by the main antenna, determines that the external antenna is faulty if the diversity antenna does not receive the first detection signal, or sets the received first detection signal as the second detection signal, and obtains the antenna isolation by means of calculation according to the first detection signal and second detection signal if the diversity antenna receives the first detection signal. The external antenna is installed in advance, and original antenna isolation is known. Therefore, compared with a value of the original antenna isolation, if the antenna isolation obtained by means of calculation does not fall within a preset deviation range, it may be determined that the external antenna is faulty. After determining that the external antenna is faulty, the fault detection device obtains the main-diversity received signal strength difference of the external antenna, determines that the diversity antenna is faulty if the main-diversity received signal strength difference is not less than the first threshold, determines that the main antenna is faulty if the main-diversity received signal strength difference is not greater than the second threshold, or determines that the main antenna and the diversity antenna are faulty if the main-diversity received signal strength difference is greater than the second threshold and less than the first threshold. Compared with a fault detection method 1, if an antenna body of the main antenna is damaged, after receiving the first detection signal, the main antenna cannot transmit the first detection signal, and the diversity antenna definitely cannot receive the first detection signal received by the main antenna, or if an antenna body of the diversity antenna is damaged, the diversity antenna cannot receive the radio frequency signal, and certainly cannot receive the first detection signal transmitted by the main antenna such that when it is detected that the diversity antenna does not receive the first detection signal, it may be determined that the external antenna is faulty, and a potential failure mode in the method 1 can be effectively avoided. Compared with an existing fault detection method 2, extra components such as a detector and a directional coupler do not need to be added, and fault statuses of the diversity antenna and the main antenna can be accurately determined such that the fault statuses of the main antenna and the diversity antenna can be determined when costs are reduced, and fault determining accuracy is improved.

With reference to the first aspect of the present disclosure, in a first implementation of the first aspect of the present disclosure, determining, according to the antenna isolation, whether the external antenna is faulty includes determining whether a value of the antenna isolation falls within a preset isolation value range, determining that the external antenna is not faulty if the value of the antenna isolation falls within the preset isolation value range, or determining that the external antenna is faulty if the value of the antenna isolation does not fall within the preset isolation value range.

The external antenna is installed in advance, and because locations of the diversity antenna and the main antenna are relatively fixed, the original antenna isolation is also fixed. Based on the value of the fixed original antenna isolation, the original antenna isolation is expanded upwards and downwards by a range to obtain two thresholds that are used as preset isolation values for determining an antenna fault. The fault detection device determines whether the value of the antenna isolation falls within the preset isolation value range, determines that the external antenna is not faulty if the value of the antenna isolation falls within the preset isolation value range, or determines that the external antenna is faulty if the value of the antenna isolation does not fall within the preset isolation value range. A step of determining, according to the antenna isolation, whether the external antenna is faulty is detailed such that the solution is more implementable.

With reference to the first aspect of the present disclosure, in a second implementation of the first aspect of the present disclosure, obtaining a main-diversity received signal strength difference of the external antenna includes obtaining a first base station signal received by the main antenna and a second base station signal received by the diversity antenna, and obtaining the main-diversity received signal strength difference according to the first base station signal and the second base station signal.

Based on a diversity reception technology, during communication with a base station, the main antenna and the diversity antenna each can receive a radio frequency signal sent by the same base station. The radio frequency signal received by the main antenna is the first base station signal, and the radio frequency signal received by the diversity antenna is the second base station signal. The main-diversity received signal strength difference is obtained by subtracting a signal strength value of the second base station signal from a signal strength value of the first base station signal. A step of obtaining the main-diversity received signal strength difference of the external antenna is detailed such that the solution is more specific.

With reference to the first aspect of the present disclosure, in a third implementation of the first aspect of the present disclosure, the fault detection method further includes generating first prompt information when the diversity antenna is faulty and the main antenna is not faulty, generating second prompt information when the main antenna is faulty and the diversity antenna is not faulty, or generating third prompt information when both the main antenna and the diversity antenna are faulty.

After determining the fault statuses of the main antenna and the diversity antenna, the fault detection device generates the first prompt information when the diversity antenna is faulty and the main antenna is not faulty, generates the second prompt information when the main antenna is faulty and the diversity antenna is not faulty, or generates the third prompt information when both the main antenna and the diversity antenna are faulty. The fault detection device generates corresponding prompt information used to indicate a fault status of the external antenna.

With reference to the first aspect of the present disclosure, in a fourth implementation of the first aspect of the present disclosure, generating a first detection signal, and transmitting the first detection signal using the main antenna includes generating the first detection signal, where the first detection signal includes a signal identifier, modulating the first detection signal to obtain a transmit signal, where a frequency band of the first detection signal is a time division duplex (TDD) frequency band or two frequency division duplex (FDD) frequency bands that have an overlapping frequency band, and transmitting the transmit signal to the main antenna such that the main antenna transmits the transmit signal, and detecting whether the diversity antenna receives the first detection signal transmitted by the main antenna includes determining whether the diversity antenna obtains a received signal, determining that the diversity antenna does not receive the first detection signal transmitted by the main antenna if the diversity antenna does not obtain the received signal, demodulating the received signal if the diversity antenna obtains the received signal, determining whether the demodulated received signal includes the signal identifier, determining that the diversity antenna receives the first detection signal transmitted by the main antenna if the demodulated received signal includes the signal identifier, and determining that the diversity antenna does not receive the first detection signal transmitted by the main antenna if the demodulated received signal does not include the signal identifier.

For ease of recognizing, by the fault detection device, the first detection signal that is received by the diversity antenna and is transmitted by the main antenna, the fault detection device adds the signal identifier to the generated first detection signal. According to the other approaches, the first detection signal generated by the fault detection device is a baseband signal. A frequency of the baseband signal is relatively low, and a radiation effect during transmission is poor. Therefore, the baseband signal needs to be modulated. In addition, in an existing communications system, a frequency band of a radio frequency signal is generally a TDD frequency band or two FDD frequency bands that have an overlapping frequency band. Therefore, the first detection signal needs to be modulated, to obtain the transmit signal. The transmit signal is transmitted to the main antenna using the radio frequency coaxial cable such that the main antenna transmits the transmit signal. In this case, the fault detection device considers by default that the main antenna has transmitted the modulated first detection signal (that is, the transmit signal), and determines whether the diversity antenna obtains the received signal. If the diversity antenna does not obtain the received signal, the diversity antenna definitely does not receive the transmit signal transmitted by the main antenna, and the fault detection device determines that the diversity antenna does not receive the first detection signal transmitted by the main antenna. If the diversity antenna receives the received signal, the fault detection device demodulates the received signal, determines whether the demodulated received signal includes the signal identifier, determines that the diversity antenna receives the first detection signal transmitted by the main antenna if the demodulated received signal includes the signal identifier, or determines that the diversity antenna does not receive the first detection signal transmitted by the main antenna if the demodulated received signal does not include the signal identifier. Modulation/demodulation of the first detection signal and a step of detecting whether the diversity antenna receives the first detection signal transmitted by the main antenna are detailed such that the solution is more detailed.

With reference to the first aspect of the present disclosure, the first implementation of the first aspect, the second implementation of the first aspect, the third implementation of the first aspect, or the fourth implementation of the first aspect, in a fifth implementation of the first aspect of the present disclosure, the fault detection method further includes generating prompt information indicating that the antenna is normal if the external antenna is not faulty.

When the antenna isolation falls within the preset deviation range, the fault detection device determines that the external antenna is not faulty, and generates the prompt information indicating that the antenna is normal in order to give a prompt that fault detection does not need to be performed on the external antenna such that a time consumed for fault detection is reduced.

A second aspect of the present disclosure provides a fault detection device for an external antenna, where the external antenna includes a main antenna and a diversity antenna, and the fault detection device includes a communication baseband processor configured to generate a first detection signal, transmit the first detection signal using the main antenna, detect whether the diversity antenna receives the first detection signal transmitted by the main antenna, determine that the external antenna is faulty when the diversity antenna does not receive the first detection signal, set the received first detection signal as a second detection signal when the diversity antenna receives the first detection signal, obtain antenna isolation according to the first detection signal and the second detection signal, determine, according to the antenna isolation, whether the external antenna is faulty, obtain a main-diversity received signal strength difference of the external antenna when the external antenna is faulty, determine that the diversity antenna is faulty when the main-diversity received signal strength difference is not less than a first threshold, determine that the main antenna is faulty when the main-diversity received signal strength difference is not greater than a second threshold, and determine that the main antenna and the diversity antenna are faulty when the main-diversity received signal strength difference is greater than the second threshold and less than the first threshold.

The communication baseband processor of the fault detection device generates the first detection signal, transmits the first detection signal using the main antenna, determines that the external antenna is faulty if detecting that the diversity antenna does not receive the first detection signal, and determines, according to the antenna isolation, whether the external antenna is faulty if detecting that the diversity antenna receives the first detection signal. If the external antenna is faulty, the communication baseband processor obtains the main-diversity received signal strength difference of the external antenna, determines that the diversity antenna is faulty if the main-diversity received signal strength difference is greater than the first threshold, determines that the main antenna is faulty if the main-diversity received signal strength difference is less than the second threshold, and determines that the main antenna and the diversity antenna are faulty if the main-diversity received signal strength difference is greater than the second threshold and less than the first threshold. Compared with a fault detection method 1, if an antenna body of the main antenna is damaged, after receiving the first detection signal, the main antenna cannot transmit the first detection signal, and the diversity antenna definitely cannot receive the first detection signal received by the main antenna, or if an antenna body of the diversity antenna is damaged, the diversity antenna cannot receive a radio frequency signal, and certainly cannot receive the first detection signal transmitted by the main antenna such that when it is detected that the diversity antenna does not receive the first detection signal, it may be determined that the external antenna is faulty, and a potential failure mode in the method 1 can be effectively avoided. Compared with a fault detection method 2, extra components such as a detector and a directional coupler do not need to be added, and fault statuses of the diversity antenna and the main antenna can be accurately determined such that the fault statuses of the main antenna and the diversity antenna can be determined when costs are reduced, and fault determining accuracy is improved.

With reference to the second aspect of the present disclosure, in a first implementation of the second aspect of the present disclosure, the communication baseband processor is further configured to determine whether a value of the antenna isolation falls within a preset isolation value range, determine that the external antenna is not faulty when the value of the antenna isolation falls within the preset isolation value range, and determine that the external antenna is faulty when the value of the antenna isolation does not fall within the preset isolation value range.

The external antenna is installed in advance, and because locations of the diversity antenna and the main antenna are relatively fixed, original antenna isolation is also fixed. Based on a value of the fixed original antenna isolation, the original antenna isolation is expanded upwards and downwards by a range to obtain two thresholds that are used as preset isolation values for determining an antenna fault. The communication baseband processor determines whether the value of the antenna isolation falls within the preset isolation value range, determines that the external antenna is not faulty if the value of the antenna isolation falls within the preset isolation value range, and determines that the external antenna is faulty if the value of the antenna isolation does not fall within the preset isolation value range. A step of determining, according to the antenna isolation, whether the external antenna is faulty is detailed such that the solution is more implementable.

With reference to the second aspect of the present disclosure, in a second implementation of the second aspect of the present disclosure, the communication baseband processor is further configured to obtain a first base station signal received by the main antenna and a second base station signal received by the diversity antenna, and obtain the main-diversity received signal strength difference according to the first base station signal and the second base station signal.

Based on a diversity reception technology, during communication between the fault detection device and a base station, the main antenna and the diversity antenna each can receive a radio frequency signal sent by the same base station. The radio frequency signal received by the main antenna is the first base station signal, and the radio frequency signal received by the diversity antenna is the second base station signal. The main-diversity received signal strength difference is obtained by subtracting a signal strength value of the second base station signal from a signal strength value of the first base station signal. A step that the communication baseband processor obtains the main-diversity received signal strength difference of the external antenna is detailed such that the solution is more specific.

With reference to the second aspect of the present disclosure, in a third implementation of the second aspect of the present disclosure, the fault detection device further includes a prompter, where the prompter is configured to generate first prompt information when the diversity antenna is faulty and the main antenna is not faulty, generate second prompt information when the main antenna is faulty and the diversity antenna is not faulty, and generate third prompt information when both the main antenna and the diversity antenna are faulty.

After the communication baseband processor determines the fault statuses of the main antenna and the diversity antenna, the prompter generates the first prompt information when the diversity antenna is faulty and the main antenna is not faulty, generates the second prompt information when the main antenna is faulty and the diversity antenna is not faulty, and generates the third prompt information when both the main antenna and the diversity antenna are faulty. The prompter generated corresponding prompt information used to indicate a fault status of the external antenna.

With reference to the second aspect of the present disclosure, in a fourth implementation of the second aspect, the fault detection device further includes a transmitter and a receiver. The communication baseband processor is further configured to generate the first detection signal, where the first detection signal includes a signal identifier. The transmitter is configured to modulate the first detection signal to obtain a transmit signal, where a frequency band of the first detection signal is a TDD frequency band or two FDD frequency bands that have an overlapping frequency band, and the transmitter is further configured to transmit the transmit signal to the main antenna such that the main antenna transmits the transmit signal. The communication baseband processor is further configured to determine whether the diversity antenna obtains a received signal, and determine that the diversity antenna does not receive the first detection signal transmitted by the main antenna when the diversity antenna does not obtain the received signal, or the receiver is configured to demodulate the received signal when the diversity antenna obtains the received signal. The communication baseband processor is further configured to determine whether the demodulated received signal includes the signal identifier, determine that the diversity antenna receives the first detection signal transmitted by the main antenna when the demodulated received signal includes the signal identifier, and determine that the diversity antenna does not receive the first detection signal transmitted by the main antenna when the demodulated received signal does not include the signal identifier.

For ease of recognizing the first detection signal that is received by the diversity antenna and is transmitted by the main antenna, the communication baseband processor adds the signal identifier to the generated first detection signal. According to the other approaches, the first detection signal generated by the communication baseband processor is a baseband signal. A frequency of the baseband signal is relatively low, and a radiation effect during transmission is poor. Therefore, the baseband signal needs to be modulated. In addition, in an existing communications system, a frequency band of a radio frequency signal is generally a TDD frequency band or two FDD frequency bands that have an overlapping frequency band. Therefore, the transmitter needs to modulate the first detection signal to obtain the transmit signal. The transmitter transmits the transmit signal to the main antenna using a radio frequency coaxial cable such that the main antenna transmits the transmit signal. In this case, the communication baseband processor considers by default that the main antenna has transmitted the modulated first detection signal (that is, the transmit signal), and the communication baseband processor determines whether the diversity antenna obtains the received signal. If the diversity antenna does not obtain the received signal, the diversity antenna definitely does not receive the transmit signal transmitted by the main antenna, and the communication baseband processor determines that the diversity antenna does not receive the first detection signal transmitted by the main antenna. If the diversity antenna receives the received signal, the receiver demodulates the received signal. The communication baseband processor determines whether the demodulated received signal includes the signal identifier, and if the demodulated received signal includes the signal identifier, the communication baseband processor determines that the diversity antenna receives the first detection signal transmitted by the main antenna, or if the demodulated received signal does not include the signal identifier, the communication baseband processor determines that the diversity antenna does not receive the first detection signal transmitted by the main antenna. Modulation/demodulation by the transmitter and the receiver and a step that the communication baseband processor detects whether the diversity antenna receives the first detection signal transmitted by the main antenna are detailed such that the solution is more detailed.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
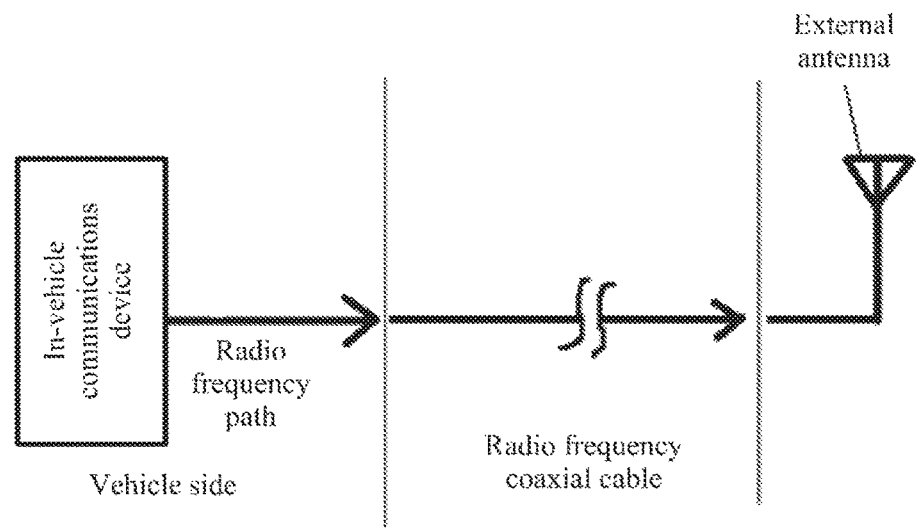
FIG. 1 is a schematic connection diagram of implementing an in-vehicle communication function according to an embodiment of the present disclosure.
Figure 2:
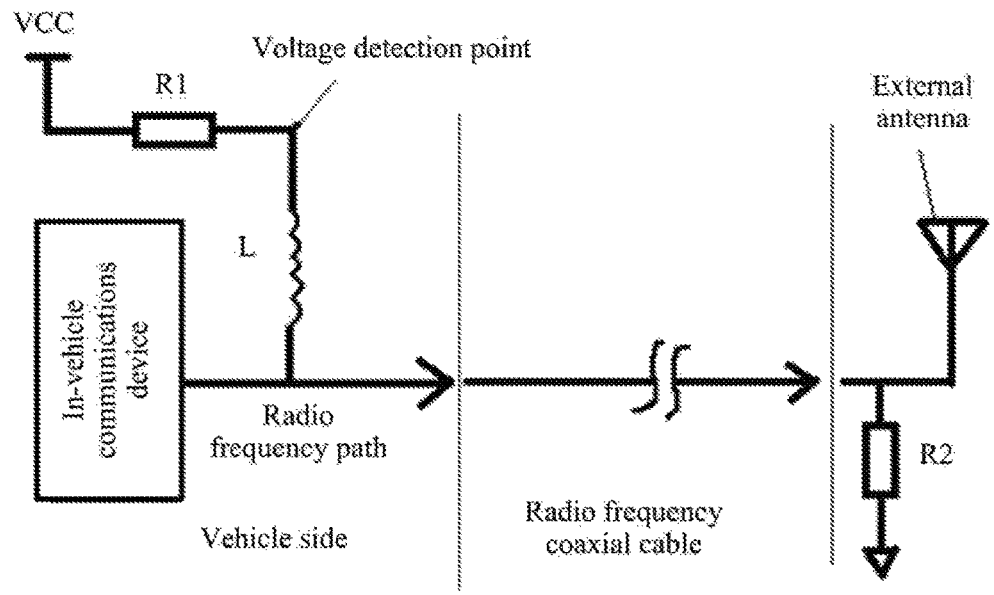
FIG. 2 is a schematic connection diagram of a fault detection method 1 for an external antenna according to an embodiment of the present disclosure.
Figure 3:
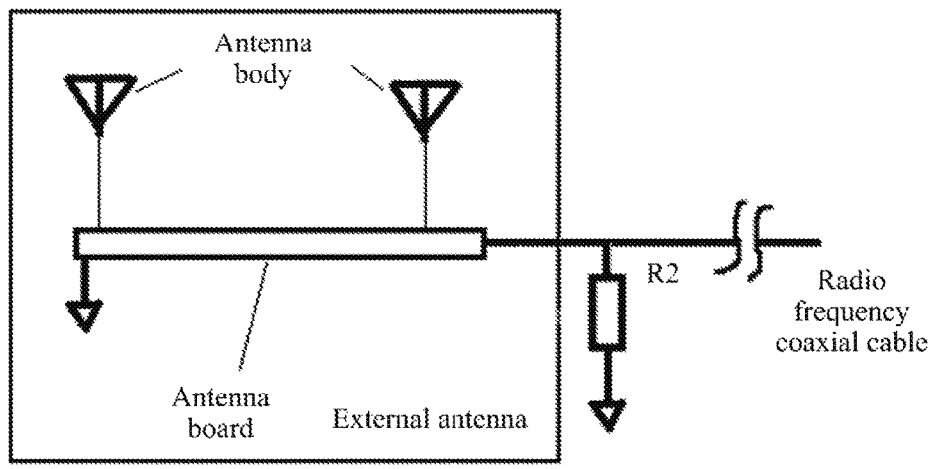
FIG. 3 is a schematic structural diagram of an external antenna in a fault detection method 1 for an external antenna according to an embodiment of the present disclosure.
Figure 4:
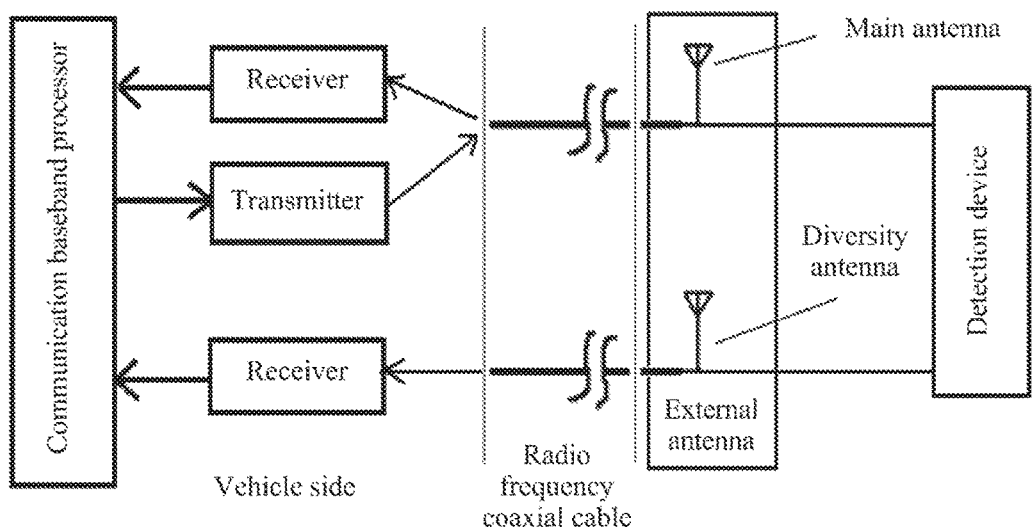
FIG. 4 is a schematic connection diagram of a fault detection method 2 for an external antenna according to an embodiment of the present disclosure.

Embodiments of the present disclosure provide a fault detection method and fault detection device for an external antenna in order to determine, on an original 3G or 4G communication hardware circuit using a detection signal and antenna isolation, whether the external antenna is faulty, and determine fault statuses of a main antenna and a diversity antenna according to a main-diversity received signal strength difference such that accuracy of determining an external antenna fault is improved when costs are reduced.

To make a person skilled in the art understand the technical solutions in the present disclosure better, the following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

A system architecture or a scenario to which the present disclosure is applied is first briefly described.

The fault detection method in the present disclosure is applied to a mobile communications device equipped with a 3G or 4G communication function, and an in-vehicle product is used as an example. A travelling speed and an environment of a vehicle are changeable. Therefore, compared with a common consumer product, the in-vehicle product has a worse use environment, imposes a higher requirement on reliability, and requires a mobile communications antenna of the in-vehicle product to have a fault diagnosis function.

In a mobile communications network, how to ensure reliability of a signal transmission link is an important indicator. A case in which a direct wave, a reflected wave, and a scattered wave that are generated by various objects on a transmission path are affected by each other is multipath fading. A basic idea of a diversity reception technology is as follows. A base station transmits a signal, and due to a multipath effect, that is, after an electromagnetic wave propagates on different paths, because time points at which all components reach a receive end are different, interference occurs by mutually superposing all the components according to their respective phases, causing distortion of an original signal or an error, a multipath signal received by the in-vehicle product is separated into multiple irrelevant (separate) signals, and then energy of the multiple signals is combined according to a specific rule in order to maximize energy of a received wanted signal, and increase a signal-to-noise ratio of the received signal. Briefly, if a signal on a wireless transmission path experiences deep fading while another relatively independent path may still include a signal whose strength is relatively large, two or more signals may be selected from multiple signals for combination such that both an instantaneous signal-to-noise ratio and an average signal-to-noise ratio at the receive end can be increased, and generally can be increased by 20 decibels (dB) to 30 dB. It can be learned that the diversity reception technology is a main anti-fading technology, and can greatly improve transmission reliability of a signal transmitted between the base station and a terminal on a multipath fading channel. A requirement for implementing the diversity reception technology is that an antenna of a device needs to have a main antenna and a diversity antenna.

Figure 5:
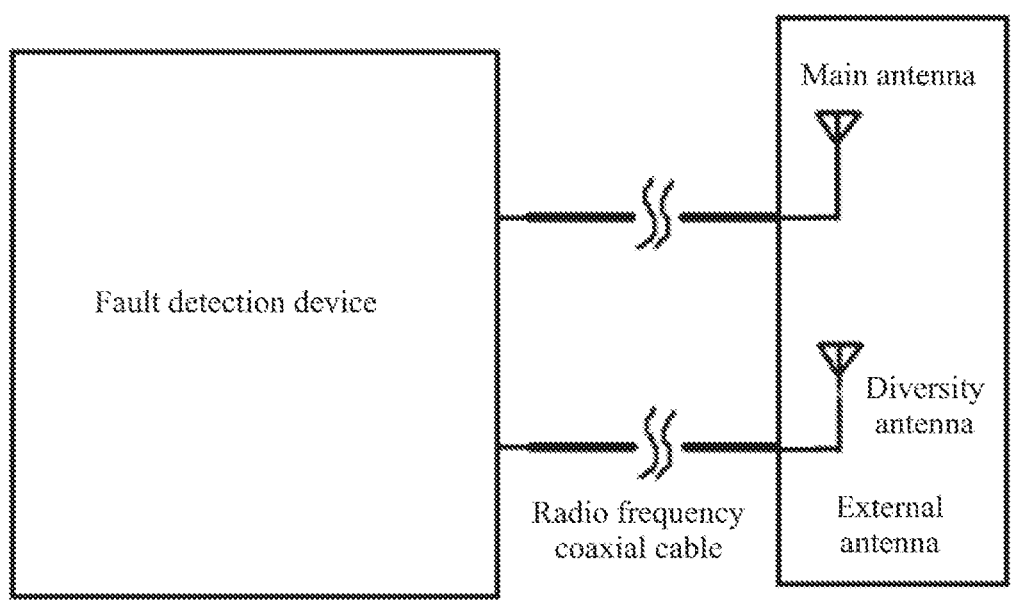
FIG. 5 is a schematic diagram of a connection between a fault detection device and an external antenna according to the present disclosure.

If an in-vehicle product uses the diversity reception technology, an external antenna has a main antenna and a diversity antenna. The main antenna is responsible for sending and receiving a radio frequency signal, and the diversity antenna only receives a radio frequency signal, but does not send a radio frequency signal. After the external antenna is installed in a vehicle, locations of the main antenna and the diversity antenna are relatively fixed. Antenna isolation depends on an antenna radiation pattern, an antenna space distance, and an antenna gain, and if the locations of the main antenna and the diversity antenna are fixed, the antenna radiation pattern and the antenna space distance are determined, and the antenna gain (a main gain and a diversity gain) during design is also known. Therefore, original antenna isolation is known. In addition, a mobile communications system has a requirement for a value range of the antenna isolation. If the antenna isolation does not meet the requirement, self excitation occurs, and call quality is affected, and the like. As shown in FIG. 5, because a fault detection device plays a role in prompting a user with a fault, the fault detection device is disposed on a center console in the vehicle, but the external antenna needs to be installed at a location inside the vehicle near a vehicle window or installed outside the vehicle. Therefore, the fault detection device needs to be connected to the main antenna and the diversity antenna of the external antenna using a radio frequency coaxial cable. An advantage of the radio frequency coaxial cable is that high bandwidth communication can be supported on a relatively long line that does not have a repeater. In addition, according to the foregoing diversity reception technology, during communication with a base station, the main antenna and the diversity antenna each can receive a radio frequency signal sent by the same base station.

The fault detection method for an external antenna in the foregoing system architecture or scenario is described in the following using an embodiment.

Figure 6:
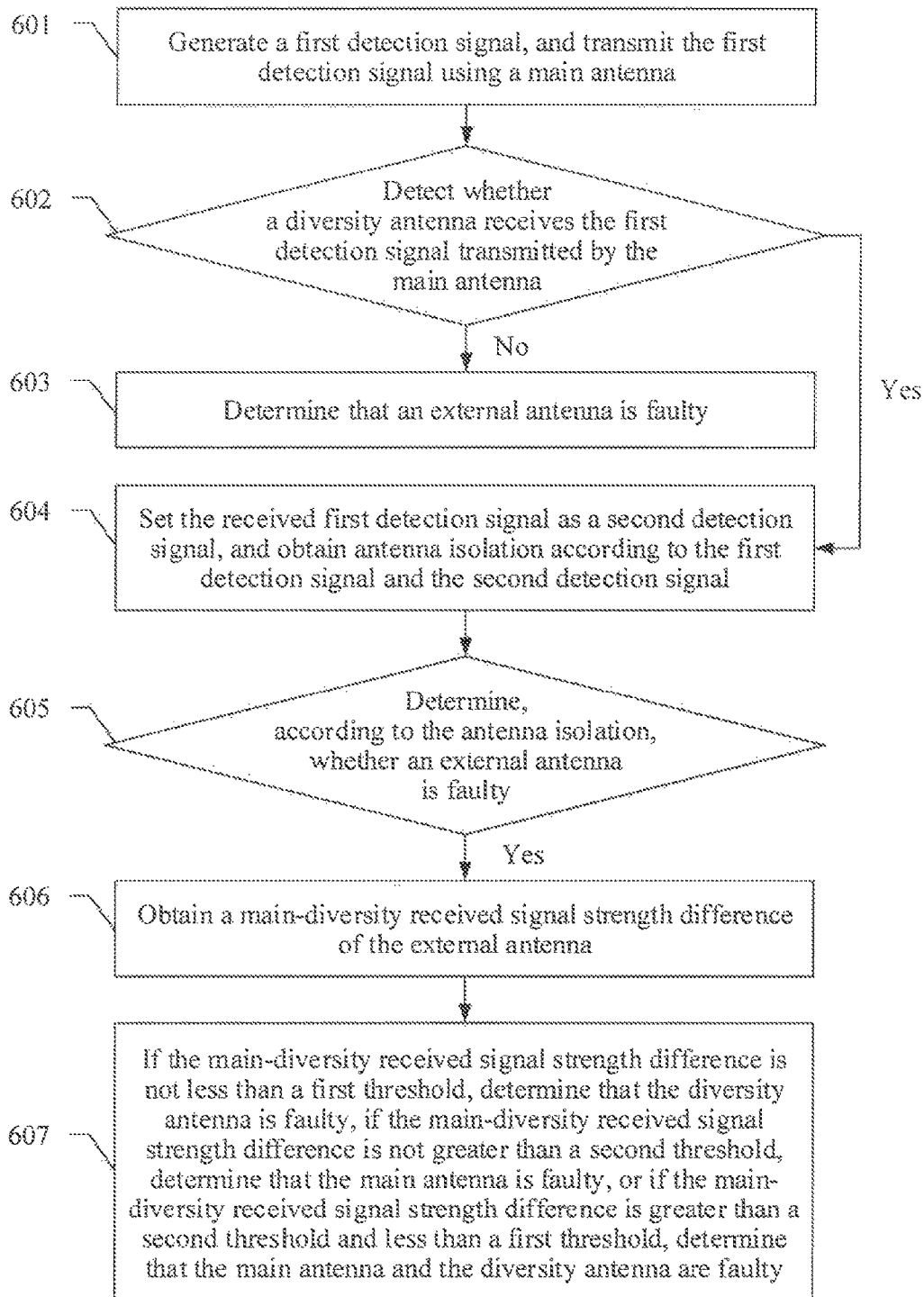
FIG. 6 is a flowchart diagram of a fault detection method for an external antenna according to an embodiment of the present disclosure.

Referring to FIG. 6, an embodiment of the present disclosure provides a fault detection method for an external antenna. The external antenna includes a main antenna and a diversity antenna, and the method includes the following steps.

Step 601: Generate a first detection signal, and transmit the first detection signal using the main antenna.

In this embodiment, when there is a need to detect whether the external antenna is faulty, a fault detection device generates the first detection signal, and transmits the first detection signal to the main antenna using a radio frequency coaxial cable in order to transmit the first detection signal using the main antenna. A manner in which the main antenna transmits the first detection signal is a manner in which an electromagnetic wave radiates in space. If an antenna body of the main antenna is damaged, the first detection signal cannot be transmitted, but a fault detection device end considers by default that the main antenna has transmitted the first detection signal.

Step 602: Detect whether the diversity antenna receives the first detection signal transmitted by the main antenna, and if no, perform step 603, or if yes, perform step 604.

In this embodiment, when receiving a radio frequency signal, the main antenna and the diversity antenna of the external antenna transmit the radio frequency signal to the fault detection device using the radio frequency coaxial cable, and detection is performed at a port of the radio frequency coaxial cable that connects the fault detection device to the diversity antenna. If the fault detection device detects that the diversity antenna does not obtain any radio frequency signal, the diversity antenna definitely does not receive the first detection signal transmitted by the main antenna, and step 603 is performed. If detecting that the diversity antenna receives a radio frequency signal, the fault detection device detects whether the radio frequency signal is the first detection signal transmitted by the main antenna, and if yes, performs step 604, or otherwise, performs step 603. The first detection signal transmitted by the main antenna is spread in a radiation manner, and the first detection signal spread in the radiation manner definitely passes through the diversity antenna. Therefore, theoretically, the diversity antenna can receive the first detection signal transmitted by the main antenna.

Step 603: Determine that the external antenna is faulty.

In this embodiment, it is determined that the diversity antenna does not receive the first detection signal transmitted by the main antenna. Therefore, it can be learned that regardless of whether the main antenna does not transmit the first detection signal or the diversity antenna cannot receive the first detection signal, it can be determined that the external antenna is faulty. Herein, that the external antenna is faulty means that radio frequency signal sending or receiving is affected, for example, the antenna body of the main antenna or that of the diversity antenna is damaged.

Step 604: Set the received first detection signal as a second detection signal, and obtain antenna isolation according to the first detection signal and the second detection signal.

In this embodiment, when the diversity antenna receives the first detection signal transmitted by the main antenna, the received first detection signal is used as the second detection signal, and the antenna isolation that is obtained according to the first detection signal and the second detection signal is as follows. Horizontal isolation (Lh) is a space loss generated by the main antenna and the diversity antenna in a horizontal spacing distance, and is expressed as a formula:

$$Lh = Q + 20lg(d/\lambda) - (Gt + Gr) + (Dt + Dr)$$

where Q is a propagation constant, d is a horizontal spacing (in units of meters (m)) between the main antenna and the diversity antenna, λ is an operating wavelength (in units of m), Gt is a gain (in units of dB) of the main antenna, Gr is a gain (in units of dB) of the diversity antenna, Dt is a loss caused by a horizontal directivity function of the main antenna, and Dr is a loss caused by a horizontal directivity function of the diversity antenna, and vertical isolation (Lv) is a space loss generated by the main antenna and the diversity antenna in a vertical spacing distance, and is expressed as a formula:

$$Lv = Q + 40lg(h/\lambda) - (Gt + Gr) + (Ct + Cr)$$

where Q is the propagation constant, h is a vertical spacing (in units of m) between the main antenna and the diversity antenna, λ is the operating wavelength (in units of m), Ct is a loss caused by a vertical directivity function of the main antenna, and Cr is a loss caused by a vertical directivity function of the diversity antenna. Values of Q, d, λ, Dt, Dr, h, Ct, and Cr are known, and (Gt+Gr) is a sum of the gain of the main antenna and the gain of the diversity antenna. Therefore, when the main antenna and/or the diversity antenna are/is faulty, a value of (Gt+Gr) is changed, and the antenna isolation is changed consequently. The value of (Gt+Gr) may be obtained by subtracting a signal strength value of the first detection signal from a signal strength value of the second detection signal in order to obtain the antenna isolation.

Step 605: Determine, according to the antenna isolation, whether the external antenna is faulty, and if yes, perform step 606.

In this embodiment, when the external antenna is normal, a value of original antenna isolation is denoted as I, and I is known. In addition, a mobile communications system has a requirement for a value range of the antenna isolation. If I does not meet the requirement, self excitation occurs, and call quality is affected, and the like. Compared with I, if a value of the antenna isolation of the external antenna does not fall within a preset deviation range, because the antenna isolation is the sum (Gt+Gr) of the gain of the main antenna and the gain of the diversity antenna, whether the main antenna or the diversity antenna is faulty cannot be determined despite the fact that the value of the antenna isolation does not fall within the preset deviation range. Therefore, it can only be determined that the external antenna is faulty. After it is determined that the external antenna is faulty, step 606 is performed. Herein, that the external antenna is faulty may be understood as that the gain of the main antenna and/or the gain of the diversity antenna are/is affected.

Step 606: Obtain a main-diversity received signal strength difference of the external antenna.

In this embodiment, according to a diversity reception technology, during communication with a base station, the main antenna and the diversity antenna each can receive a radio frequency signal sent by the same base station, and the main-diversity received signal strength difference may be obtained by subtracting a strength value of the radio frequency signal received by the diversity antenna from a strength value of the radio frequency signal received by the main antenna. When the external antenna is not faulty, the main-diversity received signal strength difference falls within a steady variation range. A first threshold and a second threshold of the main-diversity received signal strength difference are preset and used as conditions for determining whether the main antenna and the diversity antenna are faulty. The first threshold is greater than the second threshold. When the external antenna is faulty, the main-diversity received signal strength difference of the external antenna is obtained.

Step 607: If the main-diversity received signal strength difference is not less than a first threshold, determine that the diversity antenna is faulty, if the main-diversity received signal strength difference is not greater than a second threshold, determine that the main antenna is faulty, or if the main-diversity received signal strength difference is greater than the second threshold and less than the first threshold, determine that the main antenna and the diversity antenna are faulty.

In this embodiment, if the diversity antenna is faulty but the main antenna is normal, receiver sensitivity of the diversity antenna is deteriorated, and the strength value of the received radio frequency signal is definitely decreased. However, the strength value of the radio frequency signal received by the main antenna is a normal value. In this case, the main-diversity received signal strength difference is definitely greater than (not less than) the first threshold. In contrast, if the main antenna is faulty but the diversity antenna is normal, receiver sensitivity of the main antenna is deteriorated, and the strength value of the received radio frequency signal is definitely less than a normal value. However, the strength value of the radio frequency signal received by the diversity antenna is a normal value. In this case, the main-diversity received signal strength difference is definitely less than (not greater than) the second threshold.

Figure 7:
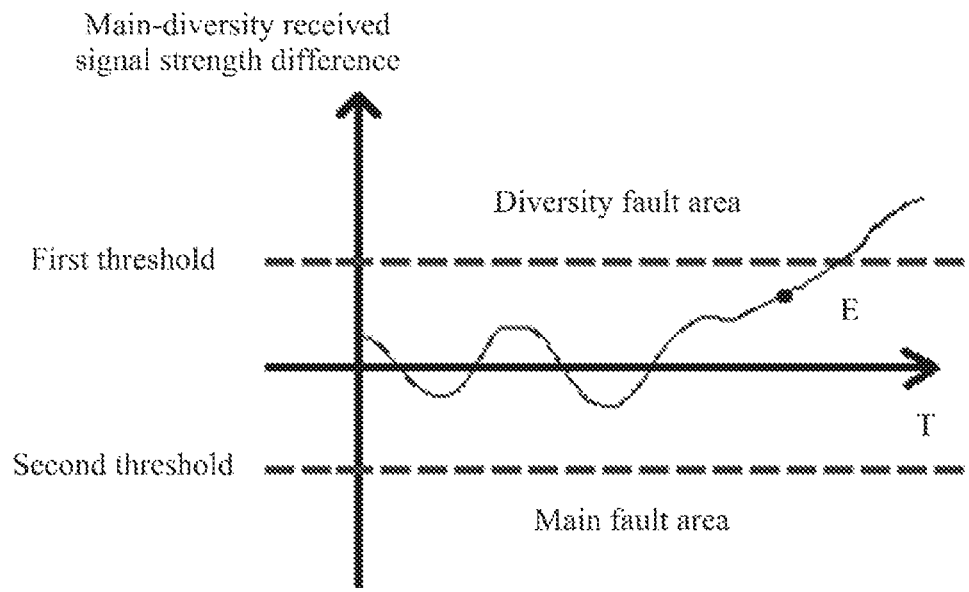
FIG. 7 is a schematic curve variation diagram of a main-diversity received signal strength difference according to the present disclosure.

In addition, because it is determined that the external antenna is definitely faulty, with reference to both a case in which the diversity antenna is faulty but the main antenna is normal and a case in which the main antenna is faulty but the diversity antenna is normal, it can be learned that both the main antenna and the diversity antenna are definitely faulty if the main-diversity received signal strength difference is between the first threshold and the second threshold. As shown in FIG. 7, if the main-diversity received signal strength difference is greater than or equal to the first threshold, it is determined that the diversity antenna is faulty, if the main-diversity received signal strength difference is less than or equal to the second threshold, it is determined that the main antenna is faulty, or if the main-diversity received signal strength difference is greater than the second threshold and less than the first threshold, it is determined that the main antenna and the diversity antenna are faulty. For example, at a point E in FIG. 7, because the main-diversity received signal strength difference is greater than the second threshold and less than the first threshold, both the main antenna and the diversity antenna are faulty.

In this embodiment of the present disclosure, the fault detection device generates the first detection signal, and transmits the first detection signal using the main antenna, determines that the external antenna is faulty if detecting that the diversity antenna does not receive the first detection signal, and determines, according to the antenna isolation, whether the external antenna is faulty if detecting that the diversity antenna receives the first detection signal. If determining that the external antenna is faulty, the fault detection device obtains the main-diversity received signal strength difference of the external antenna, and if the main-diversity received signal strength difference is greater than the first threshold, determines that the diversity antenna is faulty, determines that the main antenna is faulty if the main-diversity received signal strength difference is less than the second threshold, and determines that the main antenna and the diversity antenna are faulty if the main-diversity received signal strength difference is greater than the second threshold and less than the first threshold. Compared with a fault detection method 1, if the antenna body of the main antenna is damaged, after receiving the first detection signal, the main antenna cannot transmit the first detection signal, and the diversity antenna definitely cannot receive the first detection signal received by the main antenna, or if the antenna body of the diversity antenna is damaged, the diversity antenna cannot receive the radio frequency signal, and certainly cannot receive the first detection signal transmitted by the main antenna such that when it is detected that the diversity antenna does not receive the first detection signal, it may be determined that the external antenna is faulty, and a potential failure mode in the method 1 can be effectively avoided. Compared with a fault detection method 2, extra components such as a detector and a directional coupler do not need to be added, and fault statuses of the diversity antenna and the main antenna can be accurately determined such that the fault statuses of the main antenna and the diversity antenna can be determined when costs are reduced, and fault determining accuracy is improved.

Optionally, in some embodiments of the present disclosure, determining, according to the antenna isolation, whether the external antenna is faulty includes determining whether a value of the antenna isolation falls within a preset isolation value range, determining that the external antenna is not faulty if the value of the antenna isolation falls within the preset isolation value range, and determining that the external antenna is faulty if the value of the antenna isolation does not fall within the preset isolation value range.

Figure 8:
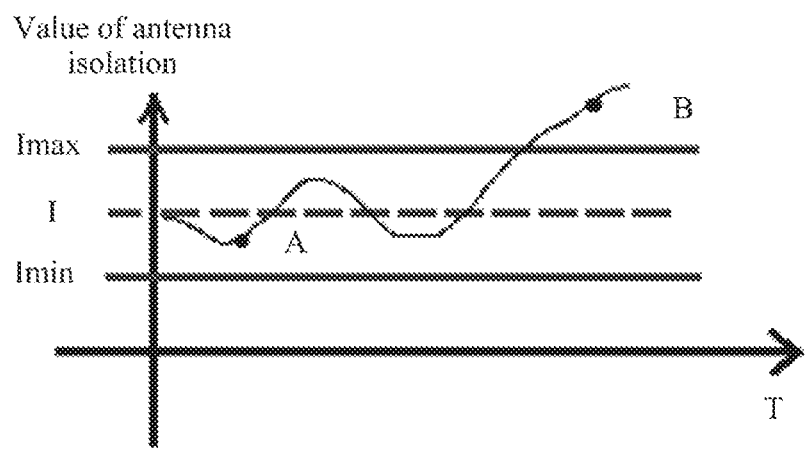
FIG. 8 is a schematic curve variation diagram of an antenna isolation value according to the present disclosure.

In this embodiment, the external antenna is installed in advance, and because locations of the diversity antenna and the main antenna are relatively fixed, the original antenna isolation is also fixed. In addition, the mobile communications system has a requirement for the value range of the antenna isolation I. If I does not meet the requirement, self excitation occurs, and call quality is affected, and the like. As shown in FIG. 8, based on the value I of the original antenna isolation, the original antenna isolation is expanded upwards and downwards by a range, to obtain a threshold Imax and a threshold Imin that are used as preset isolation values for determining an antenna fault. It can be learned from step 603 that because the antenna isolation is the sum (Gt+Gr) of the gain of the main antenna and the gain of the diversity antenna, whether the main antenna or the diversity antenna is faulty cannot be determined despite the fact that the antenna isolation does not fall within the preset deviation range. Therefore, it can only be determined that the external antenna is faulty. Whether the value of the antenna isolation falls within the preset isolation value range is determined. If the value of the antenna isolation falls within a range from the threshold Imin to the threshold Imax, it is determined that the external antenna is not faulty, or if the value of the antenna isolation does not fall within a range from the threshold Imax to the threshold Imin, call quality is affected, and it is determined that the external antenna is faulty. For example, at a point A in FIG. 8, it is determined that the external antenna is normal, and at a point B, it is determined that the external antenna is faulty. A step of determining, according to the antenna isolation, whether the external antenna is faulty is detailed such that the solution is more implementable.

Optionally, in some embodiments of the present disclosure, obtaining a main-diversity received signal strength difference of the external antenna includes obtaining a first base station signal received by the main antenna and a second base station signal received by the diversity antenna, and obtaining the main-diversity received signal strength difference according to the first base station signal and the second base station signal.

In this embodiment, based on the diversity reception technology, during communication between the fault detection device and a base station, the main antenna and the diversity antenna each can receive a radio frequency signal sent by the same base station. It may be determined, using base station identifiers in the radio frequency signals or in another manner, whether the radio frequency signals separately received by the main antenna and the diversity antenna are radio frequency signals transmitted by the same base station. No limitation is imposed. The radio frequency signal that is received by the main antenna and is transmitted by a base station 1 is obtained and used as the first base station signal, and the radio frequency signal that is received by the diversity antenna and is transmitted by the base station 1 is obtained and used as the second base station signal. The main-diversity received signal strength difference is obtained by subtracting a signal strength value of the second base station signal from a signal strength value of the first base station signal. A step of obtaining the main-diversity received signal strength difference of the external antenna is detailed such that the solution is more specific.

Optionally, in some embodiments of the present disclosure, the fault detection method further includes generating first prompt information when the diversity antenna is faulty and the main antenna is not faulty, generating second prompt information when the main antenna is faulty and the diversity antenna is not faulty, and generating third prompt information when both the main antenna and the diversity antenna are faulty.

In this embodiment, after the fault detection device determines the fault statuses of the main antenna and the diversity antenna, the fault detection device generates corresponding prompt information used to indicate a fault status of the external antenna. For example, the first prompt information is that a disposed fault indicator is blinking green, the second prompt information is that the disposed fault indicator is blinking red, and the third prompt information is that the disposed fault indicator is blinking yellow. For example, when seeing that the fault indicator of the fault detection device is blinking yellow, a user can visually know that both the main antenna and the diversity antenna of the external antenna are faulty.

Optionally, in some embodiments of the present disclosure, generating a first detection signal, and transmit the first detection signal using the main antenna includes generating the first detection signal, where the first detection signal includes a signal identifier, modulating the first detection signal, to obtain a transmit signal, where a frequency band of the first detection signal is a TDD frequency band or two FDD frequency bands that have an overlapping frequency band, and sending the transmit signal to the main antenna such that the main antenna transmits the transmit signal.

Detecting whether the diversity antenna receives the first detection signal transmitted by the main antenna includes determining whether the diversity antenna obtains a received signal, determining that the diversity antenna does not receive the first detection signal transmitted by the main antenna if the diversity antenna does not obtain the received signal, demodulating the received signal if the diversity antenna obtains the received signal, determining whether the demodulated received signal includes the signal identifier, determining that the diversity antenna receives the first detection signal transmitted by the main antenna if the demodulated received signal includes the signal identifier, and determining that the diversity antenna does not receive the first detection signal transmitted by the main antenna if the demodulated received signal does not include the signal identifier.

In this embodiment, for ease of recognizing, by the fault detection device, the first detection signal that is received by the diversity antenna and is transmitted by the main antenna, the fault detection device adds the signal identifier to the generated first detection signal. According to the other approaches, the first detection signal generated by the fault detection device is a baseband signal. A frequency of the baseband signal is relatively low, and a radiation effect during transmission is poor. Therefore, the baseband signal needs to be modulated. In addition, in an existing communications system, a frequency band of a radio frequency signal is generally a TDD frequency band or two FDD frequency bands that have an overlapping frequency band. Therefore, the first detection signal needs to be modulated to obtain the transmit signal. The transmit signal is transmitted to the main antenna using the radio frequency coaxial cable such that the main antenna transmits the transmit signal. In this case, the fault detection device considers by default that the main antenna has transmitted the modulated first detection signal (that is, the transmit signal), even though the main antenna is faulty and does not transmit the modulated first detection signal, and determines whether the diversity antenna obtains the received signal. If the diversity antenna does not obtain the received signal, the diversity antenna definitely does not receive the transmit signal transmitted by the main antenna, and the fault detection device determines that the diversity antenna does not receive the first detection signal transmitted by the main antenna. If the diversity antenna receives the received signal, the fault detection device demodulates the received signal, determines whether the demodulated received signal includes the signal identifier, determines that the diversity antenna receives the first detection signal transmitted by the main antenna if the demodulated received signal includes the signal identifier, and determines that the diversity antenna does not receive the first detection signal transmitted by the main antenna if the demodulated received signal does not include the signal identifier. Modulation/demodulation of the first detection signal and a step of detecting whether the diversity antenna receives the first detection signal transmitted by the main antenna are detailed such that the solution is more detailed.

Optionally, in some embodiments of the present disclosure, the fault detection method further includes generating prompt information indicating that the antenna is normal if the external antenna is not faulty.

In this embodiment, when the antenna isolation falls within the preset deviation range, the fault detection device determines that the external antenna is not faulty, and generates the prompt information indicating that the antenna is normal in order to give a prompt that fault detection does not need to be performed on the external antenna such that a time consumed for fault detection is reduced.

Figure 9:
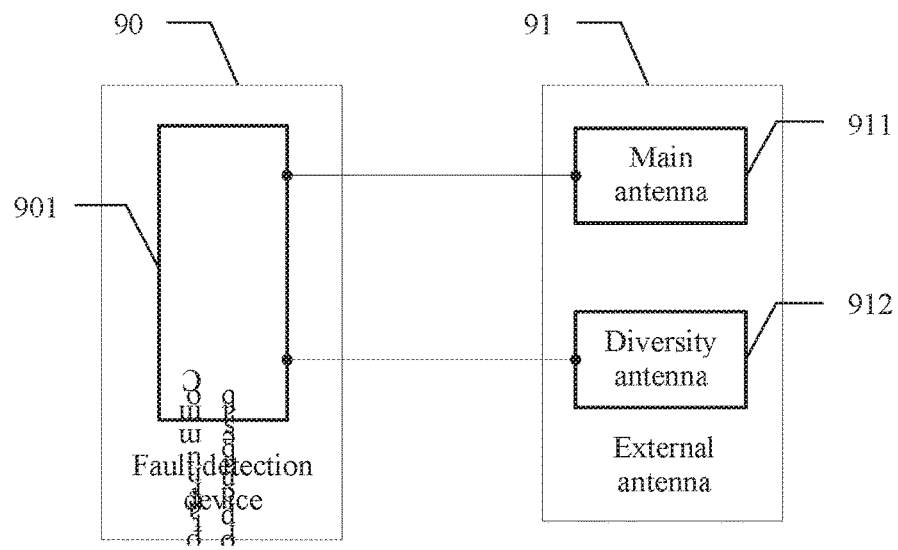
FIG. 9 is a schematic structural diagram of an external antenna and a fault detection device according to an embodiment of the present disclosure.

The fault detection method for an external antenna is described in the foregoing embodiment. In the following, a signal transmission system between a fault detection device and an external antenna is used as an example for describing a fault detection device. As shown in FIG. 9, a fault detection device 90 is connected to an external antenna 91 using a radio frequency coaxial cable, the external antenna 91 has a main antenna 911 and a diversity antenna 912, and the fault detection device 90 has a communication baseband processor 901.

Referring to FIG. 9, an embodiment of the present disclosure provides a fault detection device 90 for an external antenna 91, including a communication baseband processor 901 configured to generate a first detection signal, and transmit the first detection signal using a main antenna 911.

The communication baseband processor 901 is further configured to detect whether a diversity antenna 912 receives the first detection signal transmitted by the main antenna 911.

The communication baseband processor 901 is further configured to determine that the external antenna 91 is faulty when the diversity antenna 912 does not receive the first detection signal, set the received first detection signal as a second detection signal, and obtain antenna isolation according to the first detection signal and the second detection signal when the diversity antenna 912 receives the first detection signal.

The communication baseband processor 901 is further configured to determine, according to the antenna isolation, whether the external antenna 91 is faulty.

The communication baseband processor 901 is further configured to obtain a main-diversity received signal strength difference of the external antenna 91 when the external antenna 91 is faulty.

The communication baseband processor 901 is further configured to determine that the diversity antenna 912 is faulty when the main-diversity received signal strength difference is not less than a first threshold, determine that the main antenna 911 is faulty when the main-diversity received signal strength difference is not greater than a second threshold, and determine that the main antenna 911 and the diversity antenna 912 are faulty when the main-diversity received signal strength difference is greater than the second threshold and less than the first threshold.

In this embodiment of the present disclosure, the communication baseband processor 901 of the fault detection device 90 generates the first detection signal, and transmits the first detection signal using the main antenna 911, determines that the external antenna 91 is faulty if detecting that the diversity antenna 912 does not receive the first detection signal, and determines, according to the antenna isolation, whether the external antenna 91 is faulty if detecting that the diversity antenna 912 receives the first detection signal. If determining that the external antenna 91 is faulty, the communication baseband processor 901 obtains the main-diversity received signal strength difference of the external antenna 91, and determines that the diversity antenna 912 is faulty if the main-diversity received signal strength difference is greater than the first threshold, determines that the main antenna 911 is faulty if the main-diversity received signal strength difference is less than the second threshold, and determines that the main antenna 911 and the diversity antenna 912 are faulty if the main-diversity received signal strength difference is greater than the second threshold and less than the first threshold. Compared with a fault detection method 1, if an antenna body of the main antenna 911 is damaged, after receiving the first detection signal, the main antenna 911 cannot transmit the first detection signal, and the diversity antenna 912 definitely cannot receive the first detection signal received by the main antenna 911, or if an antenna body of the diversity antenna 912 is damaged, the diversity antenna 912 cannot receive a radio frequency signal, and certainly cannot receive the first detection signal transmitted by the main antenna 911 such that when it is detected that the diversity antenna 912 does not receive the first detection signal, it may be determined that the external antenna 91 is faulty, and a potential failure mode in the method 1 can be effectively avoided. Compared with a fault detection method 2, extra components such as a detector and a directional coupler do not need to be added, and fault statuses of the diversity antenna 912 and the main antenna 911 can be accurately determined such that the fault statuses of the main antenna 911 and the diversity antenna 912 can be determined when costs are reduced, and fault determining accuracy is improved.

Optionally, in some embodiments of the present disclosure, the communication baseband processor 901 is further configured to determine whether a value of the antenna isolation falls within a preset isolation value range.

The communication baseband processor 901 is further configured to determine that the external antenna 91 is not faulty when the value of the antenna isolation falls within the preset isolation value range, and determine that the external antenna 91 is faulty when the value of the antenna isolation does not fall within the preset isolation value range.

In this embodiment, the external antenna 91 is installed in advance, and because locations of the diversity antenna 912 and the main antenna 911 are relatively fixed, original antenna isolation is also fixed. In addition, a mobile communications system has a requirement for a value range of the antenna isolation I. If I does not meet the requirement, self excitation occurs, and call quality is affected, and the like. As shown in FIG. 8, based on a value I of the original antenna isolation, the original antenna isolation is expanded upwards and downwards by a range to obtain a threshold Imax and a threshold Imin that are used as preset isolation values for determining an antenna fault. It can be learned from step 603 that because the antenna isolation is (Gt+Gr) a sum of a gain of the main antenna 911 and a gain of the diversity antenna 912, whether the main antenna 911 or the diversity antenna 912 is faulty cannot be determined despite the fact that the antenna isolation does not fall within a preset deviation range. Therefore, it can only be determined that the external antenna 91 is faulty. The communication baseband processor 901 determines whether the value of the antenna isolation falls within the preset isolation value range. If the value of the antenna isolation falls within a range from the threshold Imax to the threshold Imin, the communication baseband processor 901 determines that the external antenna 91 is not faulty, or if the value of the antenna isolation does not fall within a range from the threshold Imax to the threshold Imin, call quality is affected, and the communication baseband processor 901 determines that the external antenna 91 is faulty. For example, at a point A in FIG. 8, it is determined that the external antenna 91 is normal, and at a point B, it is determined that the external antenna 91 is faulty. A step of determining, according to the antenna isolation, whether the external antenna is faulty is detailed such that the solution is more implementable.

Optionally, in some embodiments of the present disclosure, the communication baseband processor 901 is further configured to obtain a first base station signal received by the main antenna 911 and a second base station signal received by the diversity antenna 912.

The communication baseband processor 901 is further configured to obtain the main-diversity received signal strength difference according to the first base station signal and the second base station signal.

In this embodiment, based on a diversity reception technology, during communication between the fault detection device 90 and a base station, the main antenna 911 and the diversity antenna 912 each can receive a radio frequency signal sent by the same base station. It may be determined, using base station identifiers in the radio frequency signals or in another manner, whether the radio frequency signals separately received by the main antenna 911 and the diversity antenna 912 are radio frequency signals transmitted by the same base station. No limitation is imposed. The communication baseband processor 901 obtains the radio frequency signal that is received by the main antenna 911 and is transmitted by a base station 1, and sets the radio frequency signal as the first base station signal. The communication baseband processor 901 obtains the radio frequency signal that is received by the diversity antenna 912 and is transmitted by the base station 1, and sets the radio frequency signal as the second base station signal. The main-diversity received signal strength difference is obtained by subtracting a signal strength value of the second base station signal from a signal strength value of the first base station signal. A step of obtaining the main-diversity received signal strength difference of the external antenna is detailed such that the solution is more specific.

Figure 10:
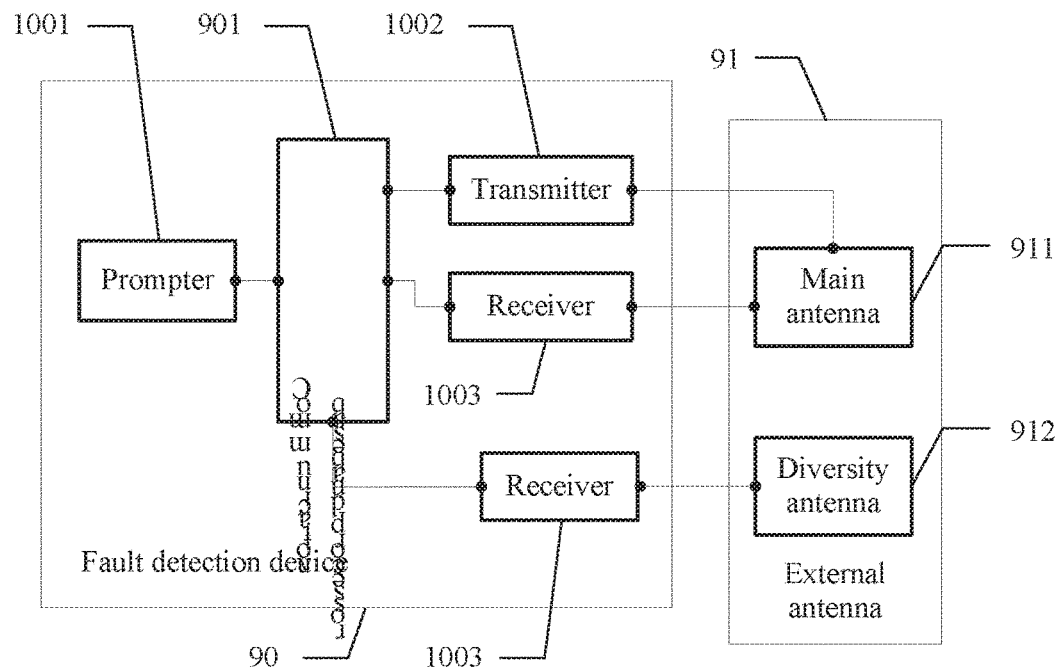
FIG. 10 is a schematic structural diagram of an external antenna and a fault detection device according to another embodiment of the present disclosure.

Optionally, as shown in FIG. 10, in some embodiments of the present disclosure, the fault detection device 90 further includes a prompter 1001.

The prompter 1001 is configured to generate first prompt information when the diversity antenna 912 is faulty and the main antenna 911 is not faulty. The prompter 1001 is further configured to generate second prompt information when the main antenna 911 is faulty and the diversity antenna 912 is not faulty, and the prompter 1001 is further configured to generate third prompt information when both the main antenna 911 and the diversity antenna 912 are faulty.

After the communication baseband processor 901 determines the fault statuses of the main antenna 911 and the diversity antenna 912, the prompter 1001 generates the first prompt information when the diversity antenna 912 is faulty and the main antenna 911 is not faulty. The prompter 1001 generates the second prompt information when the main antenna 911 is faulty and the diversity antenna 912 is not faulty, and the prompter 1001 generates the third prompt information when both the main antenna 911 and the diversity antenna 912 are faulty. The prompter 1001 generates corresponding prompt information used to indicate a fault status of the external antenna 91 such that a user can visually know the fault statuses of the main antenna 911 and the diversity antenna 912 of the external antenna 91.

Optionally, as shown in FIG. 10, in some embodiments of the present disclosure, the fault detection device 90 further includes a transmitter 1002 and a receiver 1003.

The communication baseband processor 901 is further configured to generate the first detection signal, where the first detection signal includes a signal identifier.

The transmitter 1002 is configured to modulate the first detection signal to obtain a transmit signal, where a frequency band of the first detection signal is a TDD frequency band or two FDD frequency bands that have an overlapping frequency band.

The transmitter 1002 is further configured to send the transmit signal to the main antenna 911 such that the main antenna 911 transmits the transmit signal.

The communication baseband processor 901 is further configured to determine whether the diversity antenna 912 obtains a received signal.

The communication baseband processor 901 is further configured to determine that the diversity antenna 912 does not receive the first detection signal transmitted by the main antenna 911 when the diversity antenna 912 does not obtain the received signal, and the receiver 1003 is configured to demodulate the received signal when the diversity antenna 912 obtains the received signal,.

The communication baseband processor 901 is further configured to determine whether the demodulated received signal includes the signal identifier.

The communication baseband processor 901 is further configured to determine that the diversity antenna 912 receives the first detection signal transmitted by the main antenna 911 when the demodulated received signal includes the signal identifier, and determine that the diversity antenna 912 does not receive the first detection signal transmitted by the main antenna 911 when the demodulated received signal does not include the signal identifier.

In this embodiment, for ease of recognizing, by the fault detection device 90, the first detection signal that is received by the diversity antenna 912 and is transmitted by the main antenna 911, the communication baseband processor 901 adds the signal identifier to the generated first detection signal. According to the other approaches, the first detection signal generated by the communication baseband processor 901 is a baseband signal. A frequency of the baseband signal is relatively low, and a radiation effect during transmission is poor. Therefore, the baseband signal needs to be modulated. In addition, in an existing communications system, a frequency band of a radio frequency signal is generally a TDD frequency band or two FDD frequency bands that have an overlapping frequency band. Therefore, the transmitter 1002 needs to modulate the first detection signal to obtain the transmit signal, and transmit the transmit signal to the main antenna 911 using a radio frequency coaxial cable such that the main antenna 911 transmits the transmit signal. In this case, the communication baseband processor 901 considers by default that the main antenna 911 has transmitted the modulated first detection signal (that is, the transmit signal), even though the main antenna 911 is faulty and does not transmit the modulated first detection signal. The communication baseband processor 901 determines whether the diversity antenna 912 obtains the received signal. If the diversity antenna 912 does not obtain the received signal, the diversity antenna 912 definitely does not receive the transmit signal transmitted by the main antenna 911, and the communication baseband processor 901 determines that the diversity antenna 912 does not receive the first detection signal transmitted by the main antenna 911. If the diversity antenna 912 receives the received signal, the receiver 1003 demodulates the received signal, and the communication baseband processor 901 determines whether the demodulated received signal includes the signal identifier. If the demodulated received signal includes the signal identifier, the communication baseband processor 901 determines that the diversity antenna 912 receives the first detection signal transmitted by the main antenna 911. If the demodulated received signal does not include the signal identifier, the communication baseband processor 901 determines that the diversity antenna 912 does not receive the first detection signal transmitted by the main antenna 911. Modulation/demodulation by the transmitter 1002 and the receiver 1003 and a step that the communication baseband processor 901 detects whether the diversity antenna 912 receives the first detection signal transmitted by the main antenna 911 are detailed such that the solution is more detailed.

Optionally, as shown in FIG. 10, in some embodiments of the present disclosure, the prompter 1001 is further configured to generate prompt information indicating that the antenna is normal when the external antenna 91 is not faulty.

In this embodiment, when the antenna isolation falls within the preset deviation range, the communication baseband processor 901 determines that the external antenna 91 is not faulty, and the prompter 1001 generates the prompt information indicating that the antenna is normal in order to give a prompt that fault detection does not need to be performed on the external antenna 91 such that a time consumed for fault detection is reduced.

It should be noted that the communication baseband processor 901, the receiver 1003, the transmitter 1002, and the like of the fault detection device 90 in the present disclosure exist in any in-vehicle product that has a 3G or 4G mobile communication function. Therefore, the first detection signal generated by the communication baseband processor 901 can be modulated without a need to change a hardware circuit such that the modulated first detection signal becomes a signal in a TDD frequency band or a signal in two FDD frequency bands that have an overlapping frequency band. The communication baseband processor 901 only needs to run a corresponding program in order to implement the foregoing fault detection method.

It should be noted that the present disclosure is applied to not only the in-vehicle product with the 3G or 4G mobile communication function, but also another mobile device that needs an antenna fault detection function.

It should be noted that, to make the description brief, the foregoing method embodiments are described as a series of actions. However, a person skilled in the art should understand that the present disclosure is not limited to the described action sequence, because some steps may be performed in another sequence or performed at the same time according to the present disclosure. In addition, a person skilled in the art should also appreciate that all the embodiments described in this specification are example embodiments, and the related actions and modules are not necessarily mandatory to the present disclosure.

A person of ordinary skill in the art may understand that all or some steps of the methods in the embodiments may be implemented by a program instructing relevant hardware. The program may be stored in a computer readable storage medium. The storage medium may include a read only memory (ROM), a random access memory (RAM), a magnetic disk, or an optical disc.

The data transmission method, the access network device, and the user equipment that are provided in the embodiments of the present disclosure are described in detail above. The principle and implementation of the present disclosure are described herein using specific examples in this specification. The description about the embodiments is only provided to help understand the method and core ideas of the present disclosure. In addition, a person of ordinary skill in the art can make variations and modifications to the present disclosure in terms of the specific implementations and application scopes according to the ideas of the present disclosure. Therefore, the content of this specification shall not be construed as a limit to the present disclosure.

What is claimed is:

1. A fault detection method for an external antenna, wherein the external antenna comprises a main antenna and a diversity antenna, and wherein the fault detection method comprises:
   generating a first detection signal;
   transmitting the first detection signal using the main antenna;
   detecting whether the diversity antenna receives the first detection signal from the main antenna;
   determining that the external antenna is faulty when the diversity antenna does not receive the first detection signal;
   setting the first detection signal as a second detection signal and obtaining antenna isolation according to the first detection signal and the second detection signal when the diversity antenna receives the first detection signal;
   determining, according to the antenna isolation, whether the external antenna is faulty;
   obtaining a main-diversity received signal strength difference of the external antenna when the external antenna is faulty;
   determining that the diversity antenna is faulty when the main-diversity received signal strength difference is not less than a first threshold;
   determining that the main antenna is faulty when the main-diversity received signal strength difference is not greater than a second threshold; and determining that the main antenna and the diversity antenna are both faulty when the main-diversity received signal strength difference is greater than the second threshold and less than the first threshold.

2. The fault detection method according to claim 1, wherein determining whether the external antenna is faulty comprises:
   determining whether a value of the antenna isolation falls within a preset isolation value range;
   determining that the external antenna is not faulty when the value of the antenna isolation falls within the preset isolation value range; and
   determining that the external antenna is faulty when the value of the antenna isolation does not fall within the preset isolation value range.

3. The fault detection method according to claim 1, wherein obtaining the main-diversity received signal strength difference of the external antenna comprises:
   obtaining a first base station signal from the main antenna and a second base station signal from the diversity antenna; and
   obtaining the main-diversity received signal strength difference according to the first base station signal and the second base station signal.

4. The fault detection method according to claim 1, further comprising:
   generating first prompt information when the diversity antenna is faulty and the main antenna is not faulty;
   generating second prompt information when the main antenna is faulty and the diversity antenna is not faulty; and
   generating third prompt information when both the main antenna and the diversity antenna are faulty.

5. The fault detection method according to claim 1, wherein generating and transmitting the first detection signal comprises:
   generating the first detection signal, wherein the first detection signal comprises a signal identifier;
   modulating the first detection signal to obtain a transmit signal, wherein a frequency band of the first detection signal comprises a time division duplex (TDD) frequency band; and
   transmitting the transmit signal to the main antenna, and
   wherein detecting whether the diversity antenna receives the first detection signal from the main antenna comprises:
      determining whether the diversity antenna obtains a received signal;
      determining that the diversity antenna does not receive the first detection signal from the main antenna when the diversity antenna does not obtain the received signal;
      demodulating the received signal when the diversity antenna obtains the received signal;
      determining whether the demodulated received signal comprises the signal identifier;
      determining that the diversity antenna receives the first detection signal from the main antenna when the demodulated received signal comprises the signal identifier; and
      determining that the diversity antenna does not receive the first detection signal from the main antenna when the demodulated received signal does not comprise the signal identifier.

6. The fault detection method according to claim 1, further comprising generating prompt information indicating that the external antenna is normal when the external antenna is not faulty.

7. The fault detection method according to claim 1, wherein generating and transmitting the first detection signal comprises:
   generating the first detection signal, wherein the first detection signal comprises a signal identifier;
   modulating the first detection signal to obtain a transmit signal, wherein a frequency band of the first detection signal comprises two frequency division duplex (FDD) frequency bands having an overlapping frequency band; and
   transmitting the transmit signal to the main antenna, and
   wherein detecting whether the diversity antenna receives the first detection signal from the main antenna comprises:
      determining whether the diversity antenna obtains a received signal;
      determining that the diversity antenna does not receive the first detection signal from the main antenna when the diversity antenna does not obtain the received signal;
      demodulating the received signal when the diversity antenna obtains the received signal;
      determining whether the demodulated received signal comprises the signal identifier;
      determining that the diversity antenna receives the first detection signal from the main antenna when the demodulated received signal comprises the signal identifier; and
      determining that the diversity antenna does not receive the first detection signal from the main antenna when the demodulated received signal does not comprise the signal identifier.

8. A fault detection device for an external antenna, wherein the external antenna comprises a main antenna and a diversity antenna, and wherein the fault detection device comprises:
   a memory comprising instructions; and
   a communication baseband processor coupled to the memory, wherein the instructions cause the communication baseband processor to be configured to:
      generate a first detection signal;
      transmit the first detection signal using the main antenna;
      detect whether the diversity antenna receives the first detection signal from the main antenna;
      determine that the external antenna is faulty when the diversity antenna does not receive the first detection signal;
      set the first detection signal as a second detection signal, and obtain antenna isolation according to the first detection signal and the second detection signal when the diversity antenna receives the first detection signal;
      determine, according to the antenna isolation, whether the external antenna is faulty;
      obtain a main-diversity received signal strength difference of the external antenna when the external antenna is faulty;
      determine that the diversity antenna is faulty when the main-diversity received signal strength difference is not less than a first threshold;

determine that the main antenna is faulty when the main-diversity received signal strength difference is not greater than a second threshold; and determine that the main antenna and the diversity antenna are faulty when the main-diversity received signal strength difference is greater than the second threshold and less than the first threshold.

9. The fault detection device according to claim 8, wherein the instruction further cause the communication baseband processor to be configured to:

determine whether a value of the antenna isolation falls within a preset isolation value range;

determine that the external antenna is not faulty when the value of the antenna isolation falls within the preset isolation value range; and determine that the external antenna is faulty when the value of the antenna isolation does not fall within the preset isolation value range.

10. The fault detection device according to claim 8, wherein the instruction further cause the communication baseband processor to be configured to:

obtain a first base station signal from the main antenna and a second base station signal from the diversity antenna; and obtain the main-diversity received signal strength difference according to the first base station signal and the second base station signal.

11. The fault detection device according to claim 8, wherein the instructions further cause the communication baseband processor to be configured to:

generate first prompt information when the diversity antenna is faulty and the main antenna is not faulty;

generate second prompt information when the main antenna is faulty and the diversity antenna is not faulty; and generate third prompt information when both the main antenna and the diversity antenna are faulty.

12. The fault detection device according to claim 8, wherein the fault detection device further comprises a transmitter and a receiver coupled to the memory and the communication baseband processor, wherein the instructions further cause the communication baseband processor to be configured to generate the first detection signal, wherein the first detection signal comprises a signal identifier, wherein the transmitter is configured to:

modulate the first detection signal to obtain a transmit signal, wherein a frequency band of the first detection signal comprises a time division duplex (TDD) frequency band; and transmit the transmit signal to the main antenna, wherein the instructions further cause the communication baseband processor to be configured to:

determine whether the diversity antenna obtains a received signal; and determine that the diversity antenna does not receive the first detection signal from the main antenna when the diversity antenna does not obtain the received signal, wherein the receiver is configured to demodulate the received signal when the diversity antenna obtains the received signal, and wherein the instructions further cause the communication baseband processor to be configured to:

determine whether the demodulated received signal comprises the signal identifier;

determine that the diversity antenna receives the first detection signal from the main antenna when the demodulated received signal comprises the signal identifier; and determine that the diversity antenna does not receive the first detection signal from the main antenna when the demodulated received signal does not comprise the signal identifier.

13. The fault detection device according to claim 8, wherein the instructions further cause the communication baseband processor to be configured to generate prompt information indicating that the external antenna is normal when the external antenna is not faulty.

14. The fault detection device according to claim 8, wherein the fault detection device further comprises a transmitter and a receiver coupled to the memory and the communication baseband processor, wherein the instructions further cause the communication baseband processor to be configured to generate the first detection signal, wherein the first detection signal comprises a signal identifier, wherein the transmitter is configured to:

modulate the first detection signal to obtain a transmit signal, wherein a frequency band of the first detection signal comprises two frequency division duplex (FFD) frequency bands having an overlapping frequency band; and transmit the transmit signal to the main antenna, wherein the instructions further cause the communication baseband processor to be configured to:

determine whether the diversity antenna obtains a received signal; and determine that the diversity antenna does not receive the first detection signal from the main antenna when the diversity antenna does not obtain the received signal, wherein the receiver is configured to demodulate the received signal when the diversity antenna obtains the received signal, and wherein the instructions further cause the communication baseband processor to be configured to:

determine whether the demodulated received signal comprises the signal identifier;

determine that the diversity antenna receives the first detection signal from the main antenna when the demodulated received signal comprises the signal identifier; and determine that the diversity antenna does not receive the first detection signal from the main antenna when the demodulated received signal does not comprise the signal identifier.

15. A non-transitory computer readable medium storing instructions to cause a fault detection device to perform a method comprising:

generating a first detection signal;

transmitting the first detection signal using a main antenna;

detecting whether a diversity antenna receives the first detection signal from the main antenna;

determining that an external antenna is faulty when the diversity antenna does not receive the first detection signal;

setting the first detection signal as a second detection signal, and obtaining antenna isolation according to the first detection signal and the second detection signal when the diversity antenna receives the first detection signal;

determining, according to the antenna isolation, whether the external antenna is faulty;

obtaining a main-diversity received signal strength difference of the external antenna when the external antenna is faulty;

determining that the diversity antenna is faulty when the main-diversity received signal strength difference is not less than a first threshold;

determining that the main antenna is faulty when the main-diversity received signal strength difference is not greater than a second threshold; and determining that the main antenna and the diversity antenna are faulty when the main-diversity received signal strength difference is greater than the second threshold and less than the first threshold.

16. The computer readable medium according to claim 15, wherein determining whether the external antenna is faulty comprises:

determining whether a value of the antenna isolation falls within a preset isolation value range;

determining that the external antenna is not faulty when the value of the antenna isolation falls within the preset isolation value range; and determining that the external antenna is faulty when the value of the antenna isolation does not fall within the preset isolation value range.

17. The computer readable medium according to claim 15, wherein obtaining the main-diversity received signal strength difference of the external antenna comprises:

obtaining a first base station signal from the main antenna and a second base station signal from the diversity antenna; and obtaining the main-diversity received signal strength difference according to the first base station signal and the second base station signal.

18. The computer readable medium according to claim 15, further comprising:

generating first prompt information when the diversity antenna is faulty and the main antenna is not faulty;

generating second prompt information when the main antenna is faulty and the diversity antenna is not faulty; and generating third prompt information when both the main antenna and the diversity antenna are faulty.

19. The computer readable medium according to claim 15, wherein generating and transmitting the first detection signal comprises:

generating the first detection signal, wherein the first detection signal comprises a signal identifier;

modulating the first detection signal to obtain a transmit signal, wherein a frequency band of the first detection signal comprises a time division duplex (TDD) frequency band or two frequency division duplex (FDD) frequency bands having an overlapping frequency band; and transmitting the transmit signal to the main antenna, and wherein detecting whether the diversity antenna receives the first detection signal from the main antenna comprises:

determining whether the diversity antenna obtains a received signal;

determining that the diversity antenna does not receive the first detection signal from the main antenna when the diversity antenna does not obtain the received signal;

demodulating the received signal when the diversity antenna obtains the received signal;

determining whether the demodulated received signal comprises the signal identifier;

determining that the diversity antenna receives the first detection signal from the main antenna when the demodulated received signal comprises the signal identifier; and determining that the diversity antenna does not receive the first detection signal from the main antenna when the demodulated received signal does not comprise the signal identifier.

20. The computer readable medium according to claim 15, further comprising generating prompt information indicating that the external antenna is normal when the external antenna is not faulty.

* * * * *